UNITED STATES PATENT OFFICE.

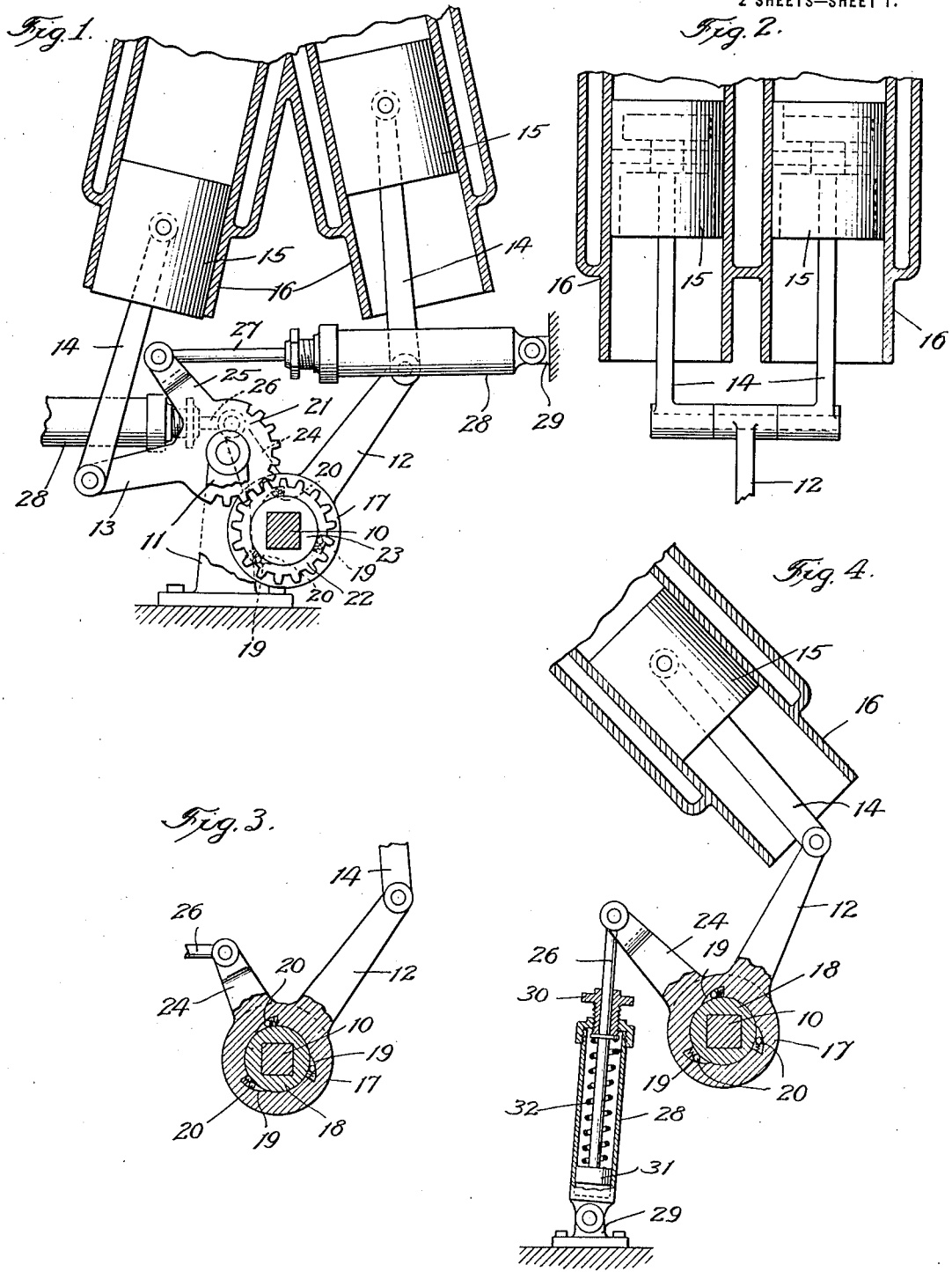

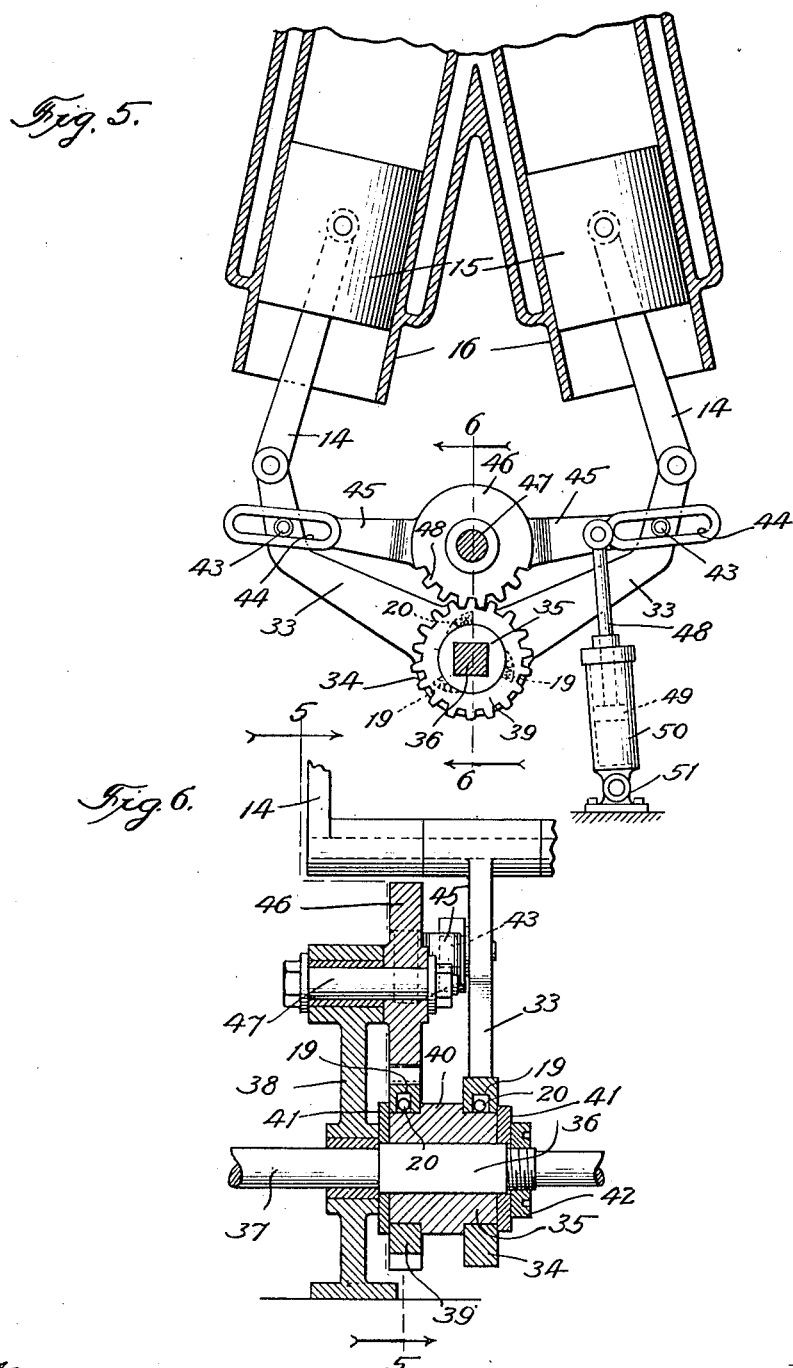

WILLIAM R. ELWELL, OF CLEVELAND, OHIO.

TRANSMISSION MECHANISM FOR OPERATING ENGINE-SHAFTS.

1,291,642.  Specification of Letters Patent.  Patented Jan. 14, 1919.

Application filed January 19, 1917. Serial No. 143,212.

*To all whom it may concern:*

Be it known that I, WILLIAM R. ELWELL, a citizen of the United States, and a resident of Cleveland, county of Cuyahoga, and State of Ohio, have invented certain new and useful Improvements in Transmission Mechanism for Operating Engine-Shafts, of which the following is a full, clear, and exact description.

The invention relates to transmission mechanism for explosive engines for operating automobiles and the like and seeks to provide an improved, compact construction which will obviate the necessity of using a crank shaft and which will facilitate the operation of the engine.

Figure 1 is a view in elevation illustrating the improved means for connecting the pistons to the engine shaft. Fig. 2 is a detail view illustrating the manner of connecting the pistons of a number of cylinders to the shaft operating lever. Fig. 3 is a detail view illustrating the automatic, one-way clutch mechanism for connecting the actuating lever to the engine shaft. Fig. 4 is a view similar to Fig. 1, illustrating a modification, with the preferred form of return spring device shown in section. Fig. 5 is a view similar to Fig. 1 illustrating a further modification, parts being shown in section on the line 5—5 of Fig. 6. Fig. 6 is a detail section on the line 6—6 of Fig. 5.

The engine shaft 10 is without cranks and, if desired, may be square in cross section. The shaft is actuated in the form shown in Fig. 1 by two independent, oscillating levers which are preferably in the form of bell crank levers, one being mounted directly on the engine shaft and the other pivoted on the support 11 adjacent thereto. The main or longer arms 12 and 13 of the bell crank levers extend outwardly in opposite directions from their axes and are coupled by connecting rods 14 to the pistons 15 of the engine cylinders 16. The latter are arranged as shown above the engine shaft and are disposed in inclined position on opposite sides of the vertical plane extending through the engine shaft. Preferably, a pair of cylinders is provided on each side and the connecting rods from the pistons thereof are pivoted to the corresponding actuating lever at a common point, as shown in Fig. 2, so that the pistons on each pair of cylinders move in unison.

Each of the oscillating levers 12 and 13 is connected to the engine shaft by an automatic, one-way clutch and gearing is interposed between the oscillating lever 13 and the engine shaft. In the construction shown, the hub 17 of the lever 12 forms a clutch member and is arranged to oscillate on a coöperating clutch member or collar 18 which is fixed to the shaft 10. The hub 17 is provided with a suitable cam recess 19 for receiving clutch rollers or balls 20 that serve to connect the lever to the shaft on the downward movement of the corresponding piston, but which are released to permit the upward movement of the lever and piston connected thereto independently of the shaft. The hub 21 of the lever 13 is provided with a gear segment which engages the teeth of a gear 22 which oscillates on a collar 23 fixed to the shaft. Similar clutch balls or rollers are interposed between the gear and collar so that the lever 13, like the lever 12, is connected to the engine shaft on its down stroke but is free therefrom during its upward movement.

Suitable return spring devices are provided for effecting the return movements of the oscillating levers and pistons and are connected to the upwardly extending short arms 24 and 25 of the bell crank levers. Preferably, the return spring devices comprise spring actuated rods 26 and 27 which are pivoted to the upper ends of the arms 24 and 25 and extend in opposite directions therefrom. Suitable oscillating supports are provided whereon these spring actuated rods are guided and preferably such supports are in the form of air cylinders 28 which are pivotally mounted at their outer ends on suitable supporting brackets 29. These air cylinders are provided at their inner ends with stuffing boxes 30 through which the rods 26 and 27 extend, and with pistons 31 (see Fig. 4) connected to the rods. Springs 32 coiled about the rods within the cylinders extend between the pistons and the inner ends of the cylinders.

The form shown in Fig. 4 is similar to that shown in Fig. 1 except that the actuating arm 13 and parts associated therewith are omitted and the oscillating air cylinder is arranged in vertical position.

During the downward or working stroke of the pistons the corresponding oscillating levers are connected by the automatic clutches to the engine shaft and impart movement thereto. At the same time, the pistons of the return air cylinders are moved toward their inner ends to compress the air and springs therein and the latter serve to effect the return movement of the actuating levers and pistons. Suitable means which are well known in the art may be provided whereby the movement of the pistons control the admission and exhaust of motor fluid and the ignition thereof.

In the construction shown in Figs. 5 and 6, the pitman rods 14 are connected to the ends of the oppositely projecting arms 33 of a bell crank lever. The hub portion 34 of this lever is mounted on a clutch member or collar 35 and the latter in turn is mounted upon the squared portion 36 of an engine shaft 37. The latter extends through and is journaled in a suitable bracket 38. A gear 39 is also mounted on the collar or clutch member 35, the gear and hub portion 34 being held in position by an intermediate shoulder 40 on the collar and end washers 41 that abut respectively against the bearing on the bracket 38 and a nut 42 threaded on the shaft.

Adjacent their outer ends the arms 33 are provided with laterally projecting pins 43 which engage slots 44 in the ends of the oppositely projecting arms 45 of an actuating lever. The hub portion 46 of this lever is mounted to oscillate on a stud 47 journaled in the upper end of the bracket 38 and the teeth of the gear segment 48 formed on the hub, mesh with the teeth of the gear 39.

As in the construction previously described, the hub 34 and gear 39 are provided with recesses 19 and clutch rollers or balls 20, the arrangement being such that the hub 34 is coupled to drive the engine shaft when the levers are oscillated in right-hand direction and when the latter are oscillated in left-hand direction the gear 39 is coupled to the engine shaft.

The cylinders and pistons are preferably arranged in pairs on opposite sides of a vertical plane extending through the engine shaft. With this construction the piston or pistons on one side serve to effect the return movement of the piston or pistons on the other side and the compression in the cylinders serves to check the movement in opposite directions of the pistons and levers. But, since the compression may be insufficient at times, some cushioning means must be provided to limit the movement of the pistons. For this purpose, in the form shown, a piston rod 48 is pivoted to one of the arms 45 and a piston 49 therein is arranged in an oscillating cylinder 50 which is pivotally mounted on a support 51. As the latter is oscillated, air is compressed in the opposite ends of the cylinder 50 thus limiting or cushioning the movements of the pistons and parts connected thereto, and also assisting in effecting the return movements thereof.

It is obvious that changes may be made in the details set forth without departure from the essentials of the invention as defined in the claims.

I claim as my invention:—

1. In transmission mechanism for explosive engines and the like, the combination with a power cylinder and a piston therein, of an engine shaft, an oscillating lever mounted on said shaft, an automatic, one-way clutch for connecting said lever to said shaft, a pitman rod connecting said lever to said piston, a spring actuated rod connected to said lever, and an oscillating support whereon said spring actuated rod is mounted, substantially as described.

2. In transmission mechanism for explosive engines and the like, the combination with a power cylinder and a piston therein, of an engine shaft, a bell crank lever mounted on said shaft, an automatic, one-way clutch for connecting said lever to said shaft, an oscillating air-spring cylinder, a piston therein having a piston rod connected to one arm of said bell crank lever, and a pitman rod connecting the other arm of said bell crank lever to the piston of said power cylinder, substantially as described.

3. In transmission mechanism for explosive engines and the like, the combination with a power cylinder and a piston therein, of an engine shaft, an oscillating bell crank lever mounted on said engine shaft, an automatic, one-way clutch for connecting said lever to said shaft, a pitman rod connecting one arm of said lever to said piston, a spring actuated rod pivoted to the other arm of said bell crank lever, and an oscillating support whereon said spring actuated rod is guided, substantially as described.

4. In transmission mechanism for explosive engines and the like, the combination of a pair of cylinders arranged side by side, an engine shaft, an oscillating lever, automatic, one-way clutch mechanism for connecting said lever to said shaft, pistons in said cylinders connected to a common point on said lever, and means connected to said lever for effecting the return movement thereof and of said pistons, substantially as described.

5. In transmission mechanism for explosive engines and the like, the combination with a pair of cylinders arranged side by side, pistons therein, an engine shaft, an oscillating lever, an automatic, one-way clutch for connecting said lever to said shaft, connections coupled to said pistons and pivoted at a common point to said lever, and a spring actuated device pivotally connected to said lever for effecting the return movement thereof and of said pistons, substantially as described.

6. In transmission mechanism for explosive engines and the like, the combination with a pair of cylinders arranged side by side, pistons in said cylinders, an engine shaft, an oscillating lever mounted on said shaft, an automatic, one-way clutch for connecting said lever to said shaft, connections coupled to said pistons and pivotally connected at a common point to said lever, a spring-actuated rod pivotally connected to said lever, and an oscillating support whereon said rod is guided.

7. In transmission mechanism for explosive engines and the like, the combination of an engine shaft, two oscillating levers, cylinders above said shaft, pistons in said cylinders connected to said levers, automatic, one-way clutches for connecting said levers to said shaft, gearing interposed between at least one of said levers and said shaft, and return connections between said levers, substantially as described.

8. In transmission mechanism for explosive engines and the like, the combination of an engine shaft, two oscillating levers, one of said levers being mounted on said shaft, gearing interposed between the other of said levers and said shaft, automatic, one-way clutches for connecting said levers to said shaft, pairs of cylinders above said shaft, pistons in said cylinders, rods connecting the pistons of said pairs of cylinders to said levers, and return devices connected to said levers, substantially as described.

9. In transmission mechanism for explosive engines and the like, the combination of an engine shaft, two levers having oppositely extending arms, one of said levers being mounted on said shaft, gearing interposed between the other of said levers and said shaft, automatic, one-way clutches connecting said levers to said shaft, cylinders above said shaft, pistons in said cylinders, rods connecting said pistons to the oppositely extending arms of said levers, and pin-and-slot connections between said arms, substantially as described.

10. In transmission mechanism, the combination of an engine shaft, two oscillating, oppositely extending levers for actuating on said shaft, gearing interposed between at least one of said levers and said shaft, engine cylinders, pistons in said cylinders connected respectively to said oppositely extending levers, return connections between said levers, one-way clutches for operatively connecting said levers to said shaft, and cushioning means for limiting the movement of said levers and pistons.

WILLIAM R. ELWELL.